(12) United States Patent
An

(10) Patent No.: US 12,504,545 B2
(45) Date of Patent: Dec. 23, 2025

(54) POSITION LOCATION FOR NAVIGATION WITHOUT GPS

(71) Applicant: Song Howard An, San Diego, CA (US)

(72) Inventor: Song Howard An, San Diego, CA (US)

( * ) Notice: Subject to any disclaimer, the term of this patent is extended or adjusted under 35 U.S.C. 154(b) by 267 days.

(21) Appl. No.: 18/527,240

(22) Filed: Dec. 2, 2023

(65) Prior Publication Data

US 2024/0230926 A1     Jul. 11, 2024

Related U.S. Application Data

(60) Provisional application No. 63/438,503, filed on Jan. 11, 2023.

(51) Int. Cl.
    *B64U 10/13*     (2023.01)
    *G01S 19/49*     (2010.01)

(52) U.S. Cl.
    CPC .............. *G01S 19/49* (2013.01); *B64U 10/13* (2023.01)

(58) Field of Classification Search
    CPC ................................ G01S 19/49; B64U 10/13
    See application file for complete search history.

*Primary Examiner* — Mathew Franklin Gordon

(57) ABSTRACT

An apparatus and method of determining the position location of a moving platform without using any GPS signals such as in the GPS-denial environment is disclosed. A direction finding system is employed to receive signals from a source of known position location and to compute the look angles. The look angles include the azimuth and the elevation information. The position location (e.g., latitude and longitude) of the moving platform is determined from the computed azimuth and elevation and the known position location of a remote signal source. There is no interactive communications required between the moving platform and the remote signal source. Consequently, the disclosed method is a passive approach employing a direction finding system to determine the position location of the moving platform from the received non-GPS signals. The position location obtained via this method is also applicable to GPS spoofing detection when the GPS is considered available.

10 Claims, 8 Drawing Sheets

POSITION LOCATION FOR NAVIGATION WITHOUT GPS

BACKGROUND

The present invention is related to the Position, Navigation, and Timing (PNT) industry. Specifically, the present invention enables maintaining reliable position location for continuous navigation for a moving platform in the GPS denial environment.

The Global Positioning System (GPS) signals are very weak by design and hence are very susceptible to jamming. In fact, any interferences even though unintentional in the GPS frequency band may bring down the GPS capability in the area. The US government opened up the GPS signals to the world in 1990s. The waveform and the data structure have been known to the public ever since. Unfortunately, some hostile groups have taken advantage of such generous offering to create threats to the general GPS users, particularly the transportation enterprises as well as the government operations. When jamming or spoofing occurs, the GPS is denied by the attackers. For mission or safety critical platforms in the air or at sea, a back-up navigational capability not depending on the GPS is strongly desired. In the defense industry, it is often required. The GPS signal conditions discussed in this disclosure shall be inclusive of all Global Navigation Satellite Systems (GNSS) worldwide.

The computational principle of the GPS is based on the concept of trilateration. The GPS receiver first computes the pseudo ranges of at least three GPS satellites in the field of view (FOV) and then determines the position location of the moving platform using the ephemeris data decoded from the received GPS signals. The fourth satellite is used to resolve the timing ambiguity needed for the pseudo ranges. The present invention is based on the triangular principles inspired by the direction finding (DF) systems employing the phase interferometry technique applied to multiple antenna elements. Effectively, more than three signals are received from same remote signal source. Each RF chain is associated with an antenna element. The antenna elements are placed according to a geometry that can produce reliable look angles of the remote signal source. The look angles in conjunction with the attitude dynamics data of the moving platform as well as the known position location of the remote signal source are used to determine the position location of the moving platform. A DF system is traditionally used to collect signal intelligence (SIGINT) including the angles of arrival (AOA) according to the electronic warfare (EW) industry. Broadband and long baseline antenna array systems have been employed in the EW industry for years.

SUMMARY

This invention discloses a method to continue having the position location information of a moving platform for safe navigation when the GPS is denied. The method determines the platform position location from a preselected known remote non-GPS signal source in non-GPS frequency bands. Specifically, the method obtains the moving platform position location information from the azimuth (AZ) and elevation (EL) angle measurements of a known signal source by employing an onboard direction finding (DF) system. When the position location of the remote signal source is confirmed, the estimated AZ and EL can be used to compute the WGS84 compliant latitude and longitude (lat/lon) of the platform. WGS84 stands for World Geodetic System 1984. The process employing the AZ/EL look angles of one known signal source to produce the position location of the moving platform is a new application. Only one known remote signal source for use at a time is sufficient to accomplish the objective.

A remote signal source can be a geostationary orbit (GEO), medium earth orbit (MEO), or low earth orbit (LEO) satellite, or a high altitude long endurance (HALE) unmanned aerial vehicle (UAV), etc. All the satellite operations, commercial or government-owned, are regulated by the Federal Communications Commission (FCC) in the United States and the International Telecommunication Union (ITU) in the world. The satellite ephemeris data can be available to the public via the beacon signals or upon request and relayed via a separate communication channel. The HALE system is most probably sponsored and operated by the government. It is reasonable to assume that the ephemeris data of a remote signal source of interest is available. The details of the remote signal sources can be prepared prior to the mission as part of the mission planning. Normally, multiple sources are prepared in the mission planner and only one is needed at a time for use.

The position location of a moving platform obtained from a non-GPS remote signal source can be used to offer the back-up position location information for continuous navigation when the GPS is jammed and can be used to help detect if the GPS is spoofed when the GPS appears working normally. As a result, the present invention is an add-on system to a GPS-equipped moving platform to enhance navigational safety and reliability.

DESCRIPTION OF THE INVENTION

Figure 1:
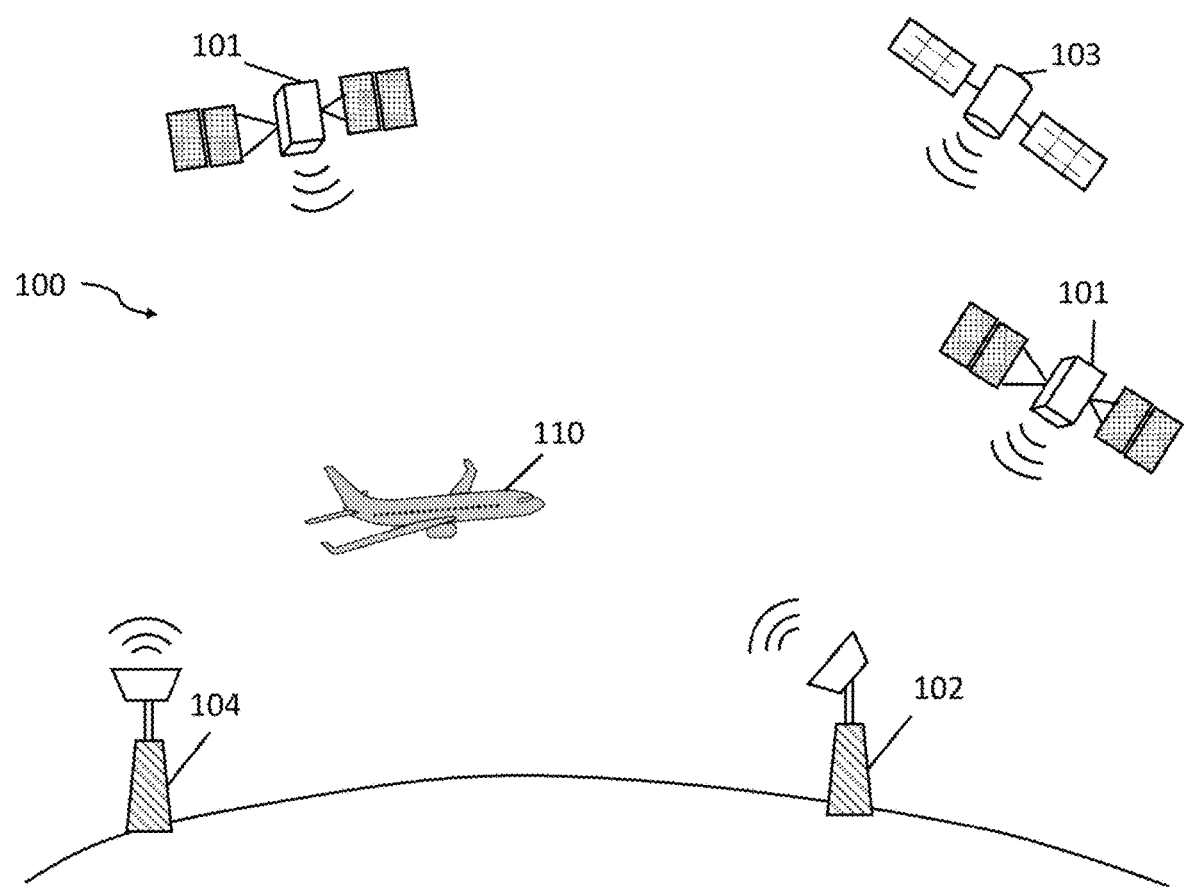
FIG. 1 illustrates the operational view 100 of the disclosure. When a GPS jammer 102 is present around the flight path, the moving platform 110 loses the GPS 101 capability quickly. When a spoofer 104 is present, the integrity of the GPS outcome is compromised. A jammer 102 and a spoofer 104 are shown on the ground in FIG. 1. It should be understood that they can be airborne and a plurality. A separate non-GPS signal source 103 in the FOV of the moving platform, when identified and confirmed, is used to compute the position location of the moving platform.
Figure 2:
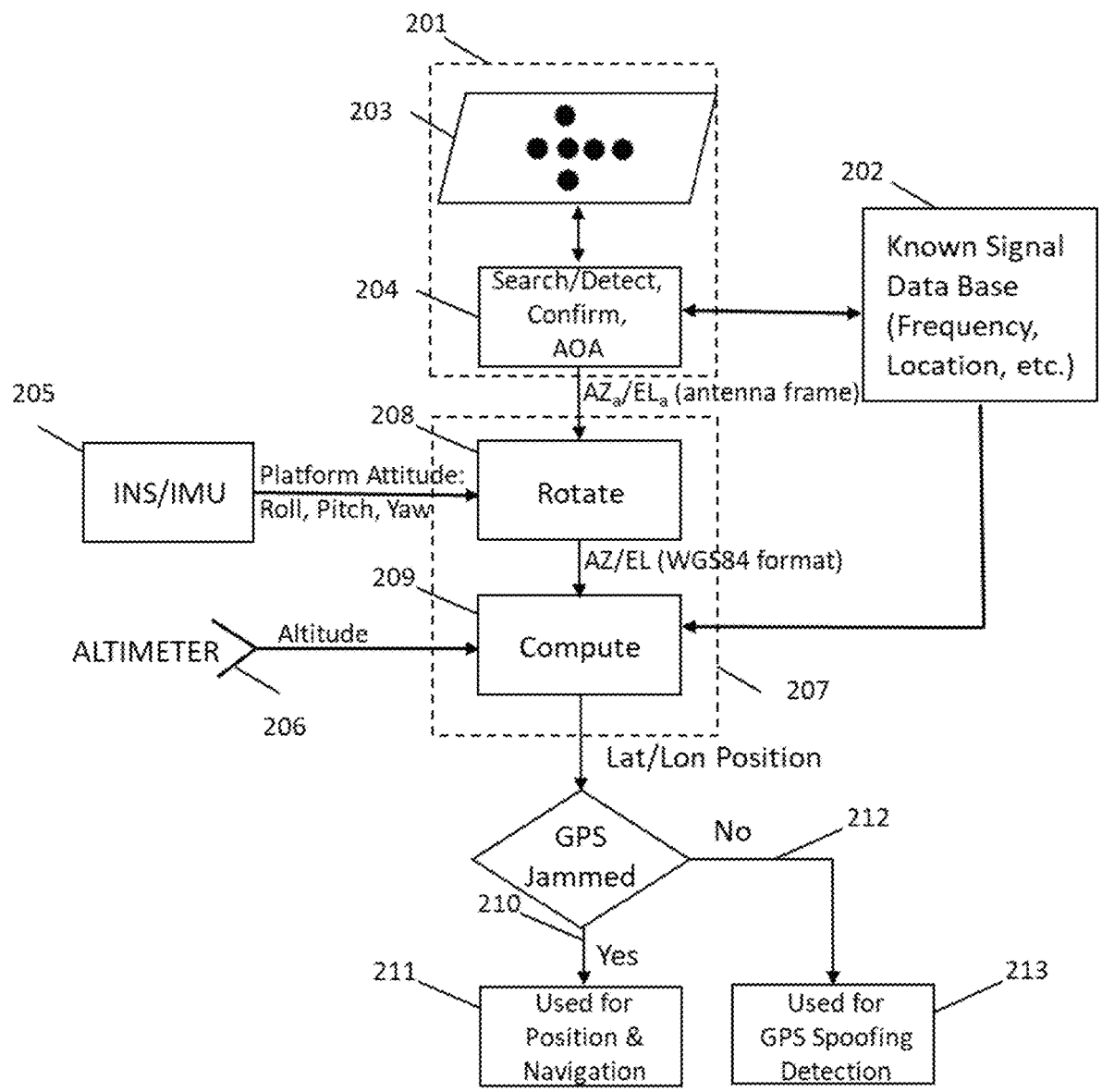
FIG. 2 illustrates the system components for the method. A DF system 201, consisting of an array antenna 203 and an AOA algorithm suite 204, is employed to determine the look angles of the impinging RF signal. The flight mission data base 202 contains several known signal sources including their respective position location and signal characteristics that are validated prior to the flight mission. An Inertial Navigation System (INS) 205 is needed to provide real time platform attitude dynamics data such as roll, pitch, and yaw information. The key components in the INS 205 consist of an Inertial Measurement Unit (IMU) 205 containing Gyroscope, Accelerometer, and Magnetometer, etc. along with the fusion software. An Altimeter 206 provides real time altitude measurement of the platform. A computing processor 207 is employed to host all real time computations needed to rotate data frame 208 and calculate 209 the position location information. When the GPS is jammed 210, the latitude and longitude (lat/lon) information is used for function of flight navigation 211. When the GPS appears available 212, the lat/lon information is used to help detect GPS spoofing 213.

The apparatus and method for use to determine the position location of a moving platform not using any GPS signals is comprised of an onboard direction finding (DF) system 201, Inertial Navigation System (INS) 205, an Altimeter 206, a remote signal source with known position location 202, and a computing processor 207. The onboard DF system 201 is typically, but not limited to, a 2-D antenna array 203 that can produce the AZ and EL angles of the received signal from a remote signal source. The signal processing suite 204 in the DF system 201 contains the capabilities such as RF signal frequency search, detection, and confirmation, as well as the Angle of Arrival (AOA) estimation. The AOA algorithm is developed based on the antenna element placement design. It is understood that the accuracy of the AOA estimate is critical for a reliable position location estimate. Normally, a long baseline array for broad frequency range is expected in the design requirements. The AZ and EL obtained at the output of the DF system 201 is with respect to the antenna orientation, denoted as $AZ_a$ and $EL_a$, respectively. In order to be able to calculate the lat/lon of the platform, the $AZ_a$ and $EL_a$ must be rotated 208 to the earth-centered earth-fixed (ECEF) frame as defined in the World Geodetic System 1984 (WGS84), denoted as AZ and EL, respectively. The frame rotation 208 is carried out using the attitude dynamics of the moving platform from the INS/IMU 205 outputs. From this point on, the term satellite is to represent a known remote signal source that can be a GEO/MEO/LEO satellite, a UAV, or any signal source with known position location and the signal characteristics of the radiated beacon or waveform, etc.

The signal processing procedure to determine the lat/lon of the platform is illustrated as follows. Denote the latitude as θ and the longitude as φ. Specifically, $(\theta_1, \phi_1)$ represents the lat/lon of the known satellite location and $(\theta_0, \phi_0)$ represents the lat/lon of the moving platform to be determined. Denote $h_0$ and $h_1$ as the altitude of the platform and the remote source (e.g., a satellite), respectively, which are known parameters. Denote $AZ_a$ and $EL_a$ as the azimuth and the elevation angles looking from the antenna on the platform to the remote satellite. These two parameters $AZ_a$ and $EL_a$ represent the result of the DF system. $(AZ_a, EL_a)$ needs to be rotated from the local antenna frame to the Earth-centered Earth-fixed (ECEF) frame as specified in WGS84, denoted as (AZ, EL). Let's denote the rotations as (AZ, EL)=f($AZ_a$, $EL_a$). The f(x) function shall take into account of the platform attitude dynamics that are available at the INS/IMU outputs. The typical sensor output information includes the roll, pitch, yaw angles of the platform at the time of the $AZ_a/EL_a$ measurement. Then AZ and EL are used to determine the lat/lon of the platform as further illustrated in the following.

The AZ and EL equations based on the satellite orbital geometry around a spherical earth model are considered below. The spherical earth model is used for the sake of illustration without loss of feasibility as used in the FAA publication Earth-Referenced Aircraft Navigation and Surveillance Analysis (DOT-VNTSC-FAA-16-12). Let's denote AZ and EL by α and γ, respectively.

$$\tan(\gamma) = \frac{\cos\beta - \frac{r_0}{r_1}}{\sin\beta} \quad (1)$$

$$\tan(\alpha) = \frac{\sin L \cdot \cos\theta_1}{\cos\theta_0 \cdot \sin\theta_1 - \cos\theta_1 \cdot \sin\theta_0 \cdot \cos L} \quad (2)$$

where $$\cos\beta = \sin\theta_1 \cdot \sin\theta_0 + \cos\theta_1 \cdot \cos\theta_0 \cdot \cos L \quad (3)$$

$$\cos L = \cos(\phi_1 - \phi_0) \quad (4)$$

$r_0 = R_e + h_0$ and $r_1 = R_e + h_1$, in which $R_e$ is the earth radius. (5)

Note that β is the geocentric angle between the satellite and the moving platform as defined in DOT-VNTSC-FAA-16-12. For the brevity, let's denote cos β, cos L, tan(α), tan(γ), $r_0/r_1$ by u, v, c, d, and r respectively. Eq. (1) and Eq. (3) can be rewritten to Eq. (6) and Eq. (7), respectively, as shown below:

$$(1+d^2)u^2 - 2ru + r^2 - d^2 = 0 \quad (6)$$

$$u = by + a\sqrt{1-y^2} \cdot v \quad (7)$$

Thus, from Eq. (6)

$$u = \frac{r \pm \sqrt{r^2 - (1+d^2)(r^2-d^2)}}{1+d^2} \quad (8)$$

Let's denote u+ and u− as the value u with the + and the − sign, respectively, in Eq. (8); denote x=cos $\theta_0$ and y=sin $\theta_0$ and $x^2+y^2=1$ since $\phi_0$ is to be resolved; $\phi_0$ is embedded in L as shown in Eq. (4) that can be solved via known $\phi_1$ when cos L is solved; denote a=cos $\theta_1$, b=sin $\theta_1$, and $a^2+b^2=1$ since $\theta_1$ is known. Eq. (1) and Eq. (2) can be bridged through cos L to lead to Eq. (9). This bridging point is the novel enabler to compute ($\theta_0$ and $\phi_0$) from only a set of AZ and EL measurements. Eq. (9) is a second order equation in y. Although it is not trivial to have a closed form solution of Eq. (9), it can be always obtained numerically.

$$\pm\sqrt{1-y^2}\sqrt{(1+c^2y^2) - b^2(1+c^2)} = (1+c^2y^2)u - (1+c^2)by \quad (9)$$

Even though Eq. (9) can only result in at most two y values, denoted as y1 and y2, there are several conditions to consider. For example, u can be u+ or u− in addition to + sign and − sign in the equation to evaluate. Let's denote y1+, y1−, y2+, and y2− to differentiate the results from + sign and − sign for the solution y1 and y2 in Eq. (9). Note that there is a possibility that no y value is found with some u because u from Eq. (8) is simply a mathematical value that bears no geometry sense until it is plugged into the y equation. Similarly as shown in Eq. (4), there are two conditions in L, either positive or negative for the cos solved in Eq. (3). Denote them as L+ and L−, respectively. To determine the correct solution, all these numerical candidates are fed back to Eq. (1) and (2) to calculate the respective AZ and EL. The pair leading to the least error with respect to the measured AZ/EL is selected as the best estimate for $\theta_o$ and $\phi_o$.

Figure 3A:
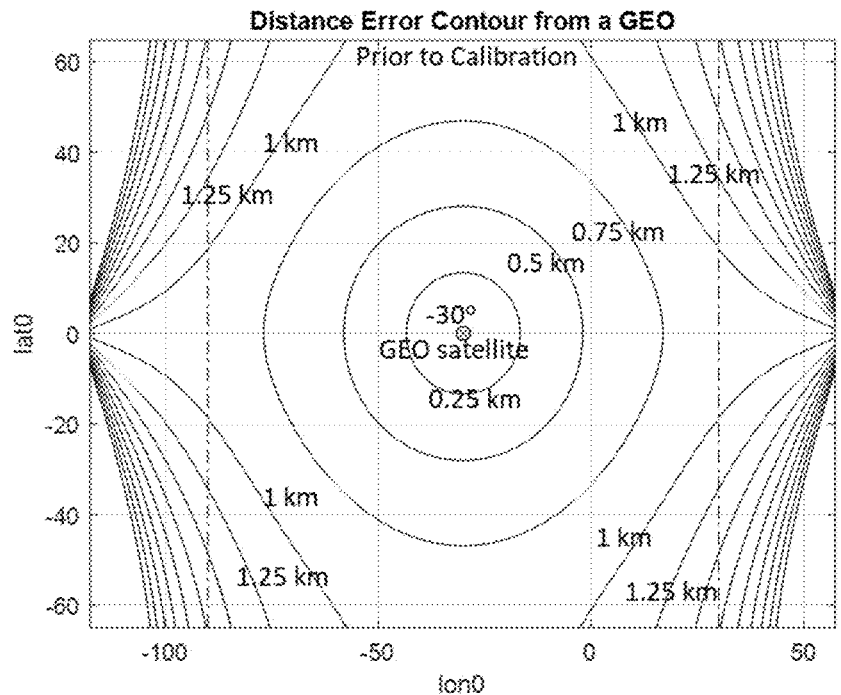
FIG. 3A displays the overall position error contour under a GEO satellite coverage prior to calibration. The position error is decomposed into three Cartesian components X, Y, Z, respectively, in FIG. 3B, FIG. 3C, and FIG. 3D. The systematic characteristics suggest a calibration technique to refine the position location calculation. The final performances in each Cartesian axis are shown in FIG. 3E, FIG. 3F, and FIG. 3G, respectively.
Figure 3B:
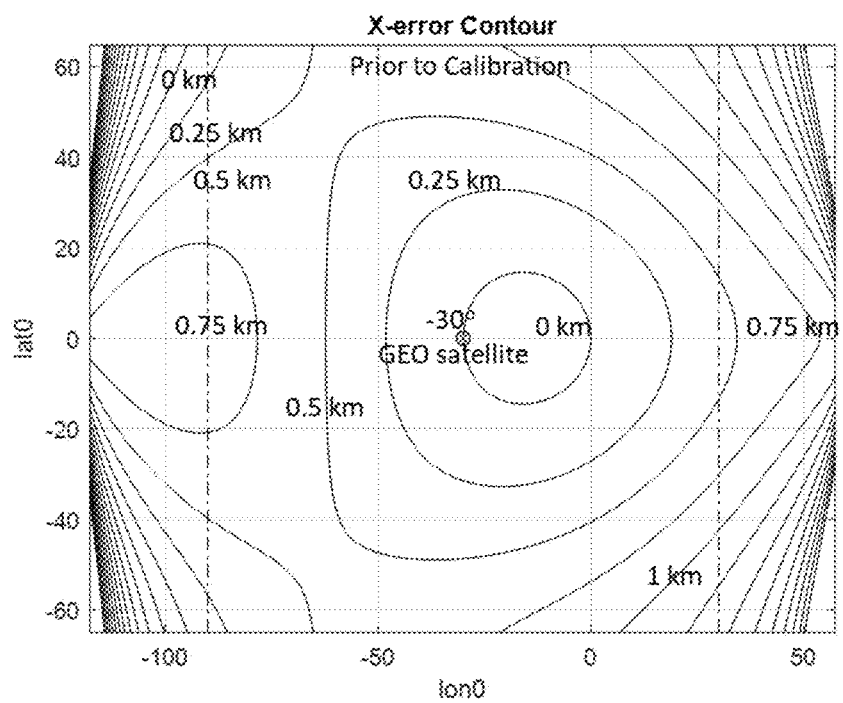
Figure 3C:
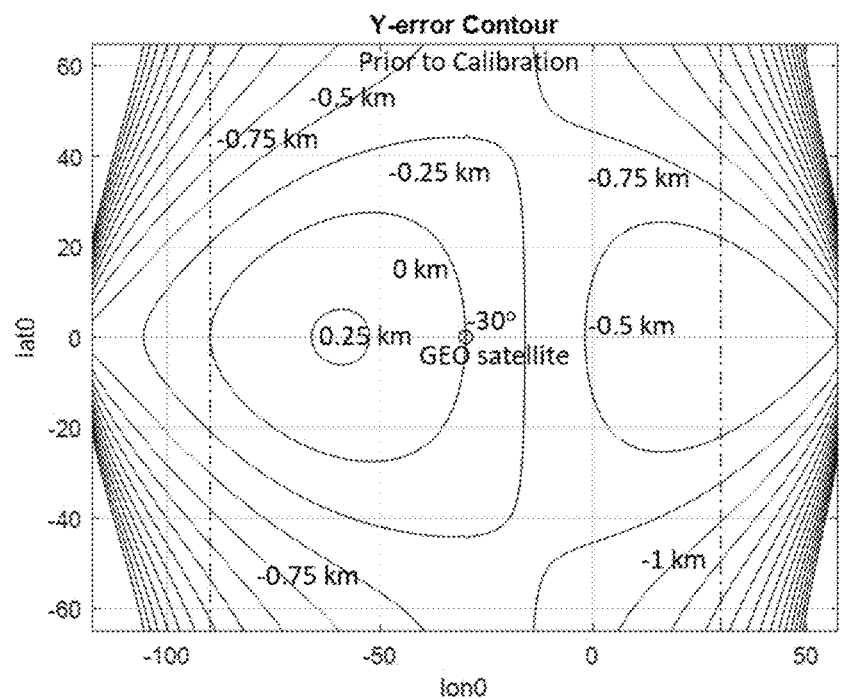
Figure 3D:
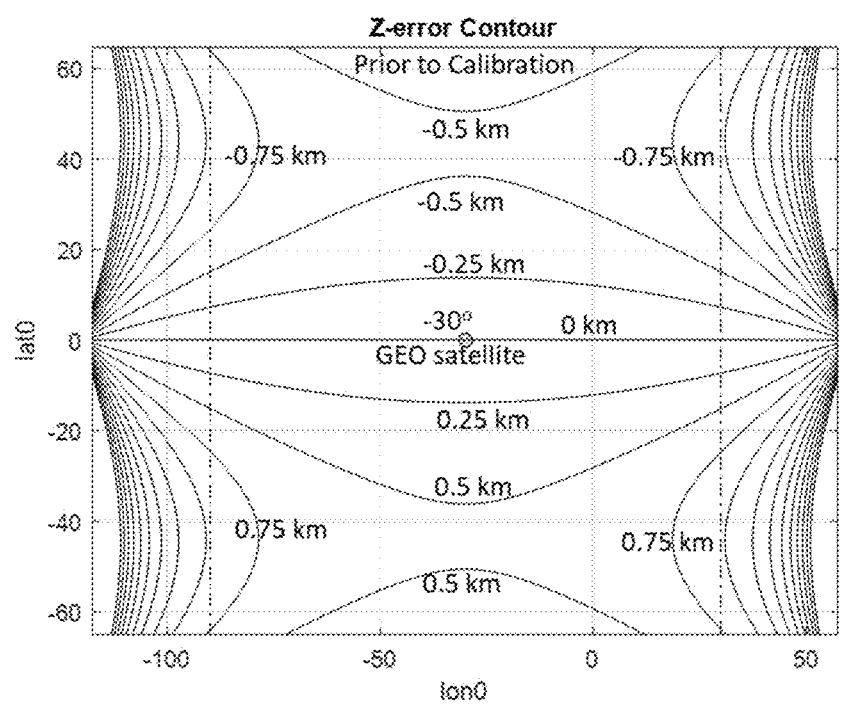
Figure 3E:
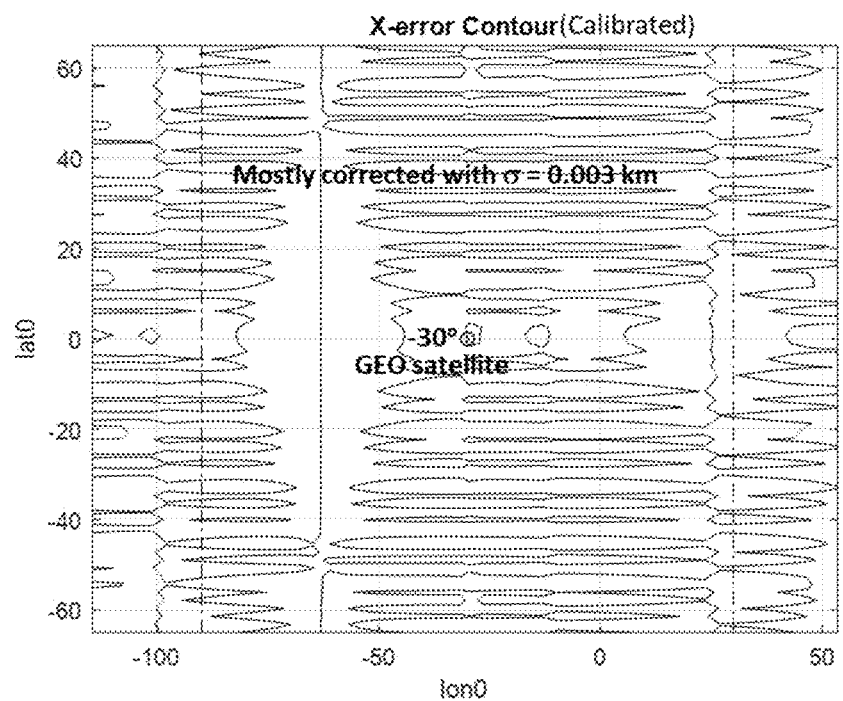
Figure 3F:
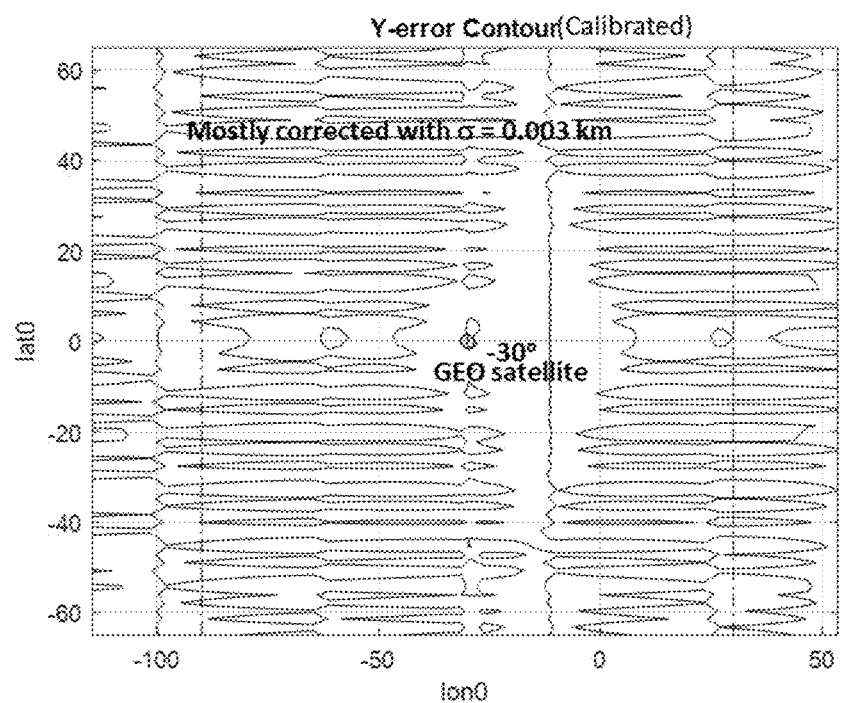
Figure 3G:
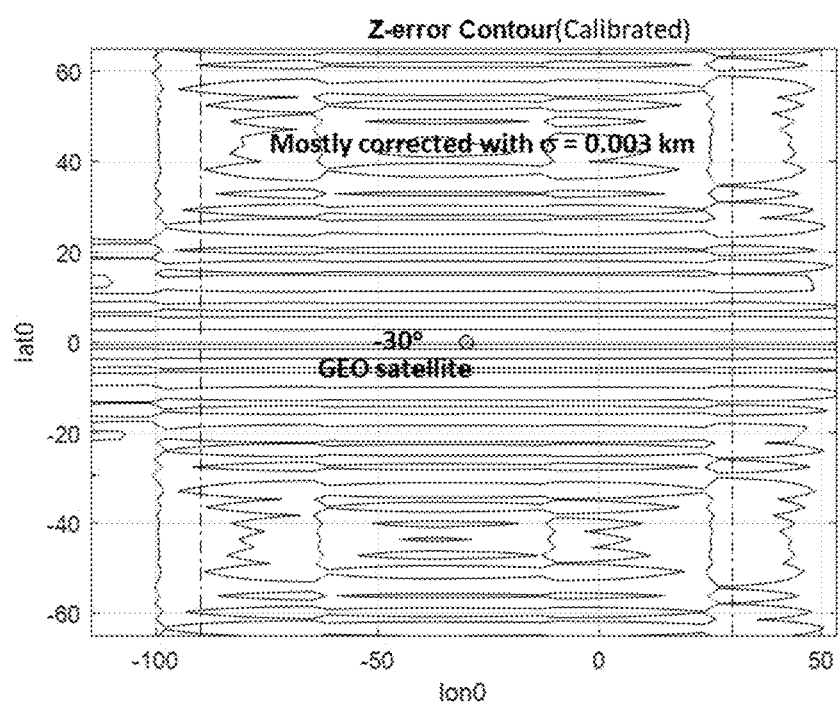

A MATLAB script is developed to evaluate the preceding procedure using a GEO satellite located at 30° W as the example. The position error contour in the Cartesian coordinate is displayed in FIG. 3A. The error component in each Cartesian axis, X, Y, Z, is further displayed in FIG. 3B, FIG. 3C, and FIG. 3D, respectively. It is shown that the disclosed method works as expected with some error characteristics. This error phenomenon is known as the dilution of precision (DOP). It is also observed that the DOP is systematic. By that the error depends on the relative location between the GEO satellite and the moving platform given a specific satellite location. The systematic behavior hence suggests that a calibration or correction step be feasible and effective. As shown in FIG. 3A, when the wide area coverage is considered as one correction zone (e.g., considering north hemisphere +/−60° of longitude around the satellite location), a simple static error correction in each Cartesian component can improve the overall root mean squared (rms) position error from 0.92 kilometer (km) to 0.47 km. In fact, the systematic DOP characteristics as shown in FIG. 3B, FIG. 3C, and FIG. 3D, suggest that they should be used as the data base for calibration to correct the systematic errors. In the further MATLAB simulations, the systematic error data mentioned above are rearranged to form the correction data base that has the calculated lat/lon as the input to obtain the corresponding correction factors in three Cartesian axis X, Y, and Z. As shown in FIG. 3E, FIG. 3F, and FIG. 3G that the results are obtained from different way-point data of the moving platform, the DOP errors are shown pretty much corrected. The rms errors are now shown 0.003 km in X-, Y-, and Z-component, respectively. Such accuracy improvement is desired for maintaining continuous navigation safely in the air or at sea when the GPS is denied (either jammed or spoofed). The correction data base associated with a GEO satellite should be included in 202. The correction data base discussed thus far is from the analytical analysis. In fact, it is preferred to developing the ultimate DOP correction data base collaboratively in the industry through flight tests or real flight missions by means of machine learning. It is hoped that the ultimate DOP correction data base may be standardized by the aviation and maritime industry and available to the public. The correction data base for a LEO/MEO satellite or HALE UAV can be similarly obtained via analysis and simulation. The coverage area is much smaller than that of a GEO satellite.

Figure 4:
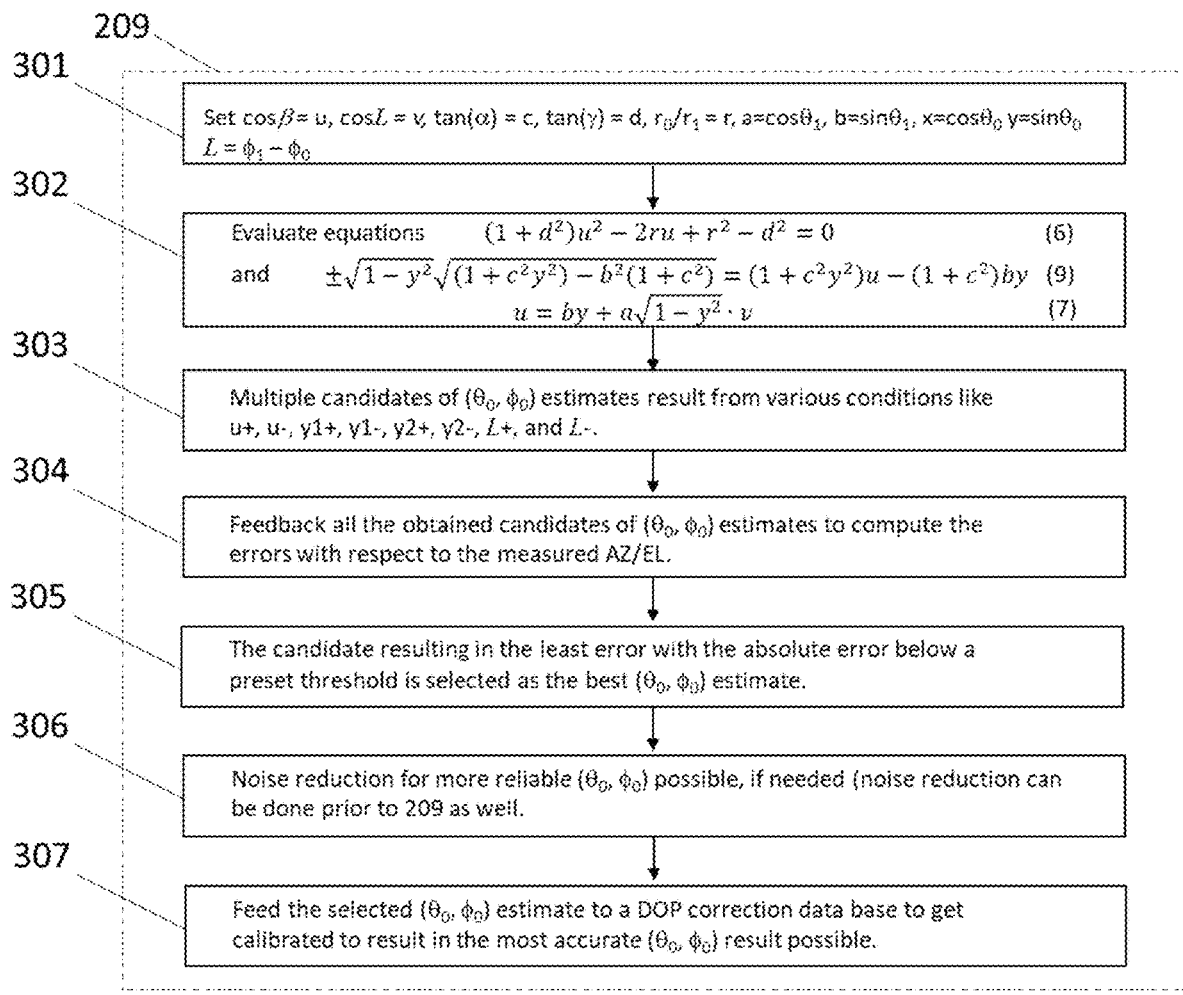
FIG. 4 depicts the core computational procedure.

The computational procedure 209 discussed above is depicted in FIG. 4. As shown, short-handed variables are firstly defined 301. Three equations (6), (9), and (7) are then evaluated 302 to obtain lat/lon estimates first. Multiple candidates of ($\theta_o$, $\phi_o$) estimates are resulted from various conditions like u+, u−, y1+, y1−, y2+, y2−, L+, and L− 303. Feed all the obtained estimate candidates of ($\theta_o$, $\phi_o$) back to Eq. (1) and Eq. (2) to compute the look angle errors with respect to the measured AZ/EL 304. The candidate resulting in the least error with the absolute error below a preset threshold is selected 305 to go through calibration using the DOP correction data base for the most accurate ($\theta_o$, $\phi_o$) result possible 307. It is understood that some kind of noise reduction process to enhance the signal to noise ratio (SNR) may be needed. It can be applied before the computational procedure 209 to have reliable AZ and EL estimates. Additional noise reduction 306 can be inserted between 305 and 307 for further enhancement, if needed.

EXEMPLARY EMBODIMENT

Figure 5:
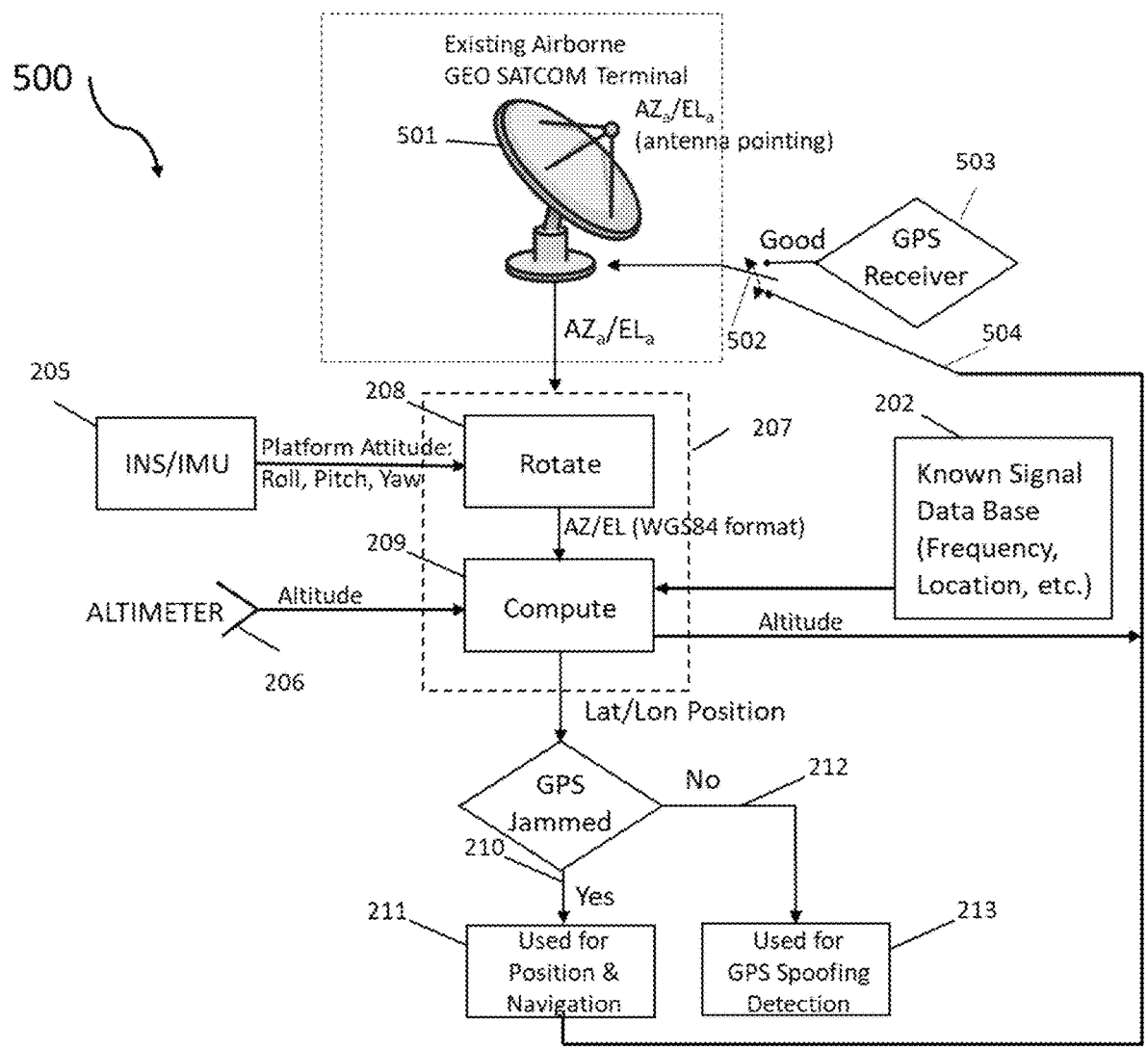
FIG. 5 shows an exemplary embodiment to illustrate an immediate application of the disclosed method to the aviation industry.

FIG. 5 shows an immediate application 500 of the disclosed invention. It is an add-on capability to an existing GEO SATCOM terminal 501 used by aircraft, manned or unmanned. The dish antenna shown is only for illustration. The type of the antenna used in the existing GEO SATCOM terminal and how it points to the GEO satellite are in original design and operation, not affected by the add-on system. The only requirement to use the disclosed invention is the interface to provide the AZ and EL information. If 501 can provide the AZ and EL in the WGS84 format to the computational core 207, the step 208 can be skipped. A switch 502 between the existing onboard GPS receiver 503 and the added-on input position location data path 504 is noted.

CONCLUDING REMARKS

An apparatus and method is disclosed to provide the position location of a moving platform employing non-GPS signals. The method shows that only one known remote signal source is sufficient to accomplish the objective. The core computational procedure 209 is presented. The performance outcome from MATLAB simulations validates the method and the computational procedure. The operational procedure is summarized as follows:

Step 1. Signal acquisition. Since the disclosed method has merits for both situations when the GPS is jammed and when the GPS is available, the DF system can be turned on at the early stage of the flight mission. The initial step is to search for the signal of known carrier frequency. Depending on the antenna FOV design, some directivity search may be needed. Signal confirmation is essential to ensure successful operation. The criteria for signal confirmation is to validate the received signal having the carrier frequency and the associated signal characteristics in the data base.

Step 2. AZ and EL estimation. The DF system will first determine the $AZ_a$ and $EL_a$ of the received signal from a remote signal source. Then they will be transformed to the WGS84 compliant AZ and EL through frame rotations based on the real time platform attitude information and the DF system installation details to compute the platform lat/lon information.

Step 3. Latitude/Longitude computation. The Latitude/Longitude parameters of the moving platform are obtained from Equations (7) and (9). A calibration or correction step is performed to overcome the DOP issue. It is understood that any modification or refinement to consider the ellipsoidal earth model is possible although it may not be necessary. The lat/lon output is used for position location and navigation when the GPS is jammed or not available. It can be used to help with GPS spoofing detection when the GPS appears available. The rationale is that the lat/lon information obtained from this disclosure employing non-GPS signal will not be same statistically as those obtained using the spoofed GPS signals.

What is claimed is:
1. A method to determine the position location of a moving platform using the look angles to a known signal source, said method comprising:
   an onboard direction finding (DF) system to determine the azimuth and elevation angles of a known signal source to the platform antenna;

an Inertial Navigation System (INS) in which the Inertial Measurement Unit (IMU) sensors and the associated fusion software generate real time platform attitude dynamics data such as roll, pitch, and yaw information;

an altimeter providing the real time altitude of the platform;

a remote signal source with known position location as well as signal characteristics;

a calibration data base used to correct systematic errors; and a computing processor that is used to perform real time computations to estimate the latitude and longitude of the moving platform employing real time azimuth and elevation angle measurements with respect to a known position location of a remote signal source, along with the data from the INS related sensors and the altimeter.

2. The said DF system as recited in claim 1 can be a 2-dimensional (2-D) phase array antenna with the associated algorithms to compute the azimuth and the elevation angles of the impinging signals onto the antenna elements.

3. The said DF system as recited in claim 1 can be an existing communication terminal on a manned or unmanned platform that can provide the azimuth and the elevation angles of the communication signals to the known remote source.

4. The said provide the azimuth and the elevation angles as recited in claim 3 can be a mechanical or electro-mechanical device programmed to move the antenna beam to position the azimuth and the elevation angles wherein the signal to noise ratio (SNR) attains or exceeds a threshold, preferably achieves the maximum level.

5. The said known signal source as recited in claim 1 can be a geostationary earth orbit (GEO), a low earth orbit (LEO) or a medium earth orbit (MEO) satellite, in which the ephemeris data can be available from the pre-mission plan or near real time messages from the satellite signal or a separate communication channel.

6. The said known signal source as recited in claim 1 can be a high altitude long endurance (HALE) unmanned aerial vehicle (UAV) that the flight path and the way point data associated with the scheduled position locations of the vehicle are validated and available in the flight mission plan or can be obtained near real time in a communication channel.

7. The said signal characteristics as recited in claim 1 includes the carrier frequency, the waveform type such as continuous wave (CW) or modulation and signal bandwidth, and any features that can be used as a reliable identification.

8. The said position location of a moving platform as recited in claim 1 is used to maintain continuous navigation safely of the moving platform in the event that the GPS is denied, either jammed or spoofed.

9. The said position location of a moving platform as recited in claim 1 can be used to detect if the GPS is spoofed or not when the GPS signals appear available.

10. The said computing processor recited in claim 1 includes a calibration step using the data from a correction data base to correct systematic errors.

* * * * *